United States Patent [19]

Asai

[11] Patent Number: 5,010,425

[45] Date of Patent: Apr. 23, 1991

[54] ACCESS CONTROLLER FOR CONTROLLING THE SEEK OPERATION OF A HEAD RELATIVE TO A RECORDING MEDIUM

[75] Inventor: Kenji Asai, Oome, Japan

[73] Assignee: Kabushiki Kaisha Toshiba, Kawasaki, Japan

[21] Appl. No.: 333,279

[22] Filed: Apr. 5, 1989

[30] Foreign Application Priority Data

Apr. 6, 1988 [JP] Japan .................. 63-84770

[51] Int. Cl.$^5$ .............................................. G11B 5/55
[52] U.S. Cl. ............................................... 360/78.04
[58] Field of Search ............... 360/78.04, 78.06, 78.07, 360/78.09

[56] References Cited

U.S. PATENT DOCUMENTS 4,887,173 12/1989 Sengoku et al. ............. 360/78.04
4,907,109 3/1990 Senio ........................... 360/78.04

OTHER PUBLICATIONS

Trikeps (transliterated), Digital Magnetic Recording Technique, 1986, pp. 151–157, "Closed—loop Positioning Control".

Tuuken (Transliterated), Research and Practicality Report, vol. 28, 10th issue, 1979, pp. 2263–2278, "Peripheral Circuit Technology for 800 MB Disk Storage Drive".

Nikkei Electronics, Aug. 3, 1981, pp. 106–119, "Large Capacity Magnetic Disk IBM 3370/3380 and Developing Devices of Other Companies Opposing thereto".

*Primary Examiner*—Aristotelis M. Psitos
*Assistant Examiner*—David L. Robertson
*Attorney, Agent, or Firm*—Oblon, Spivak, AcClelland, Maier & Neustadt

[57] ABSTRACT

An access controller includes an access mechanism having at least one head, for moving said head relative to a recording medium in accordance with an input velocity difference signal, driving section responsive to an input seek command, for generating a primary velocity signal in accordance with a distance from a current position of the head to a destination cylinder designated by the seek command, amplifying the primary velocity signal in accordance with input gain data to obtain a target velocity signal, generating an actual velocity signal from position data readout from the recording medium by the head while said head is moved, and generating the velocity difference signal from the target velocity signal and the actual velocity signal to output the velocity difference signal to the access mechanism, and determination section responsive to an input adjustment command, for determining the gain data and outputting the gain data to said driving section.

15 Claims, 8 Drawing Sheets

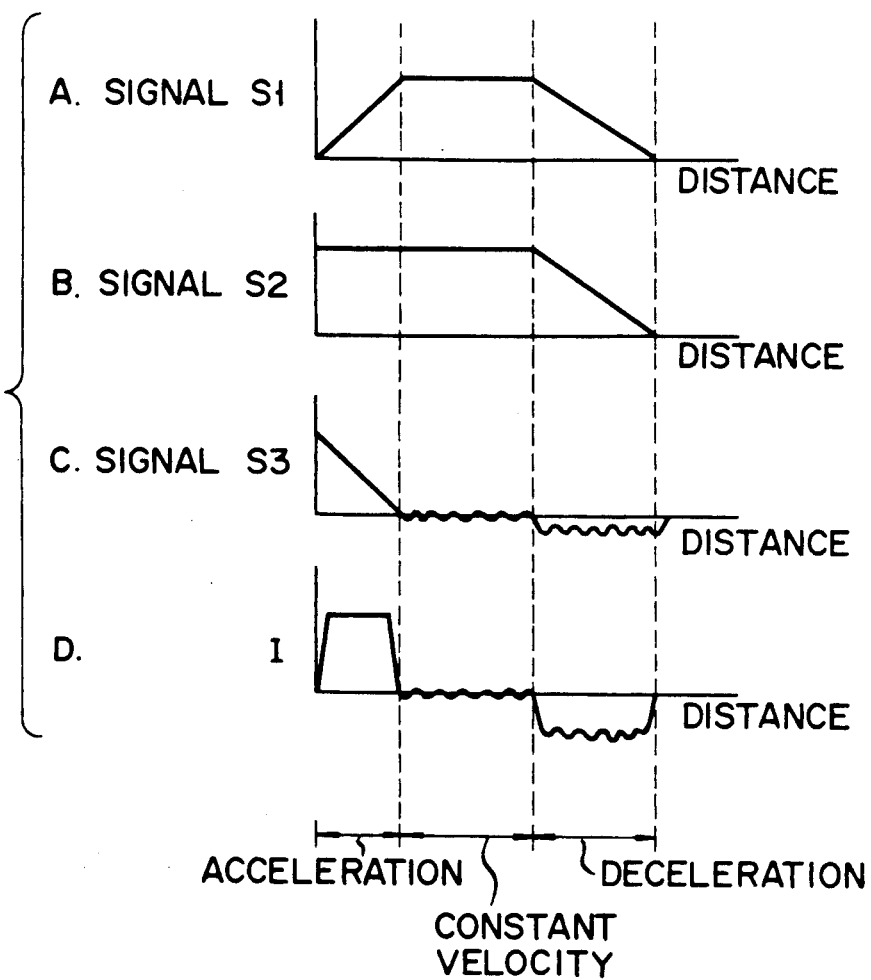
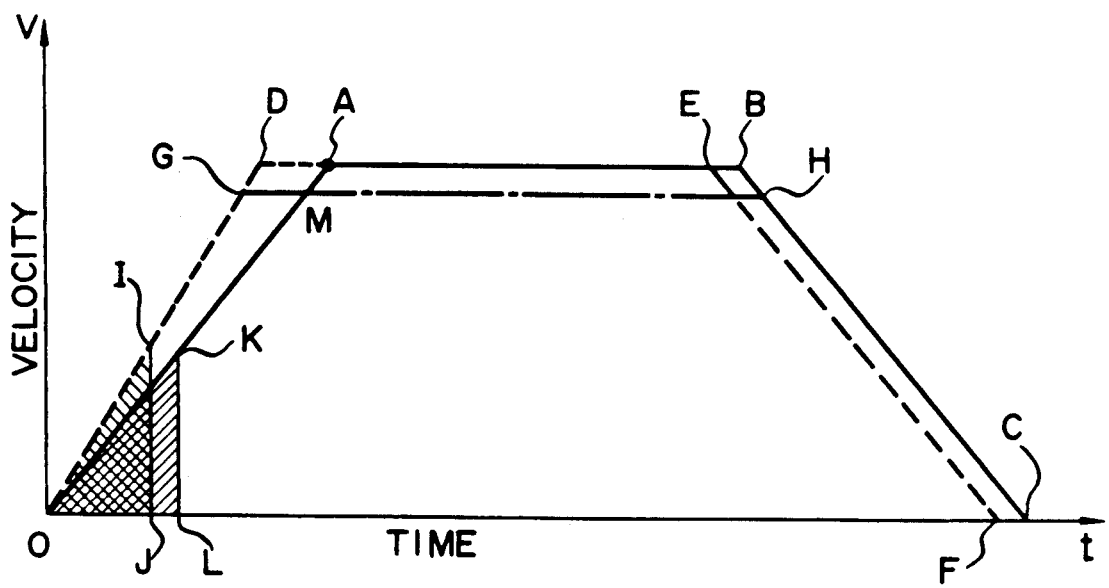
FIG. 4

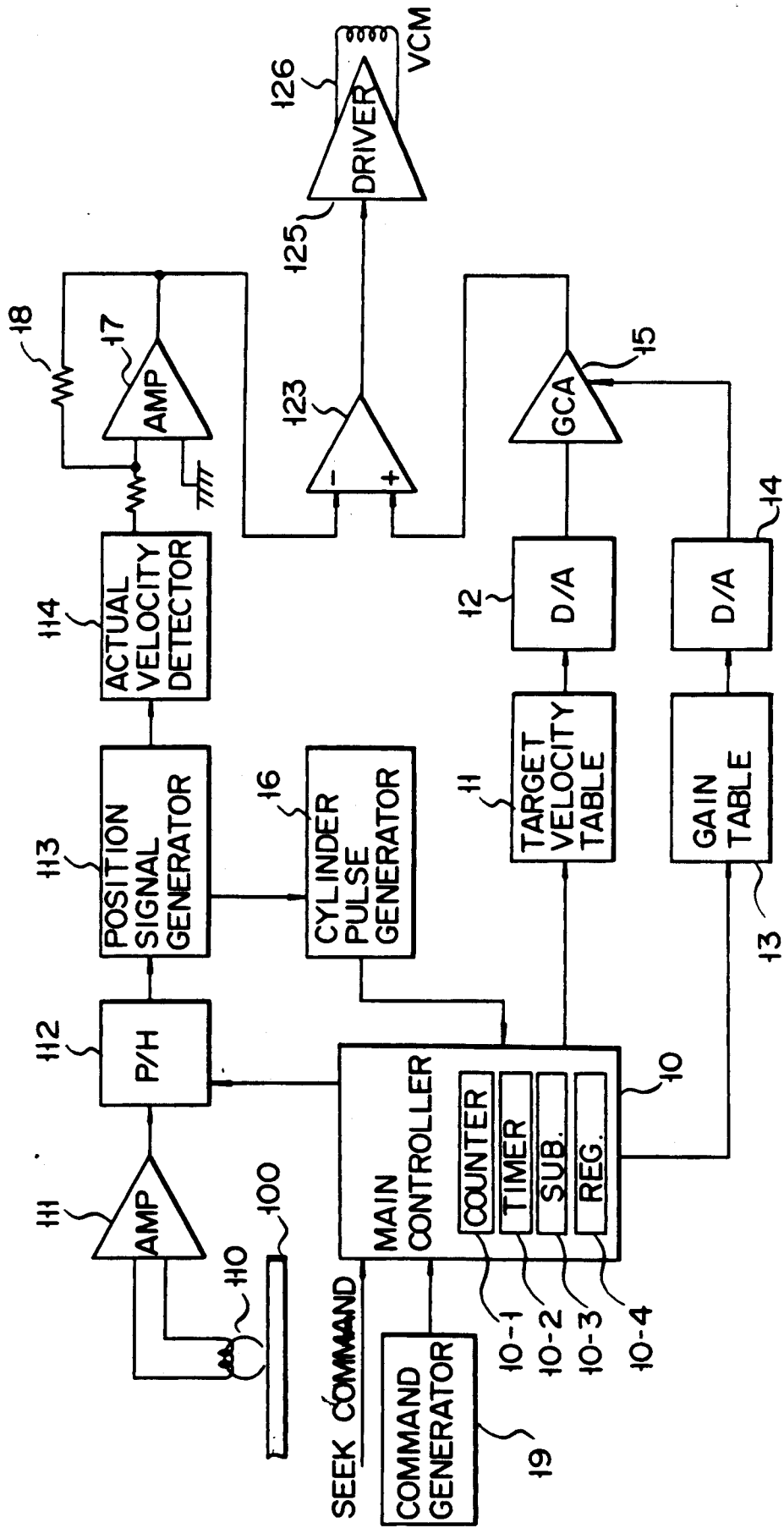
F I G. 3

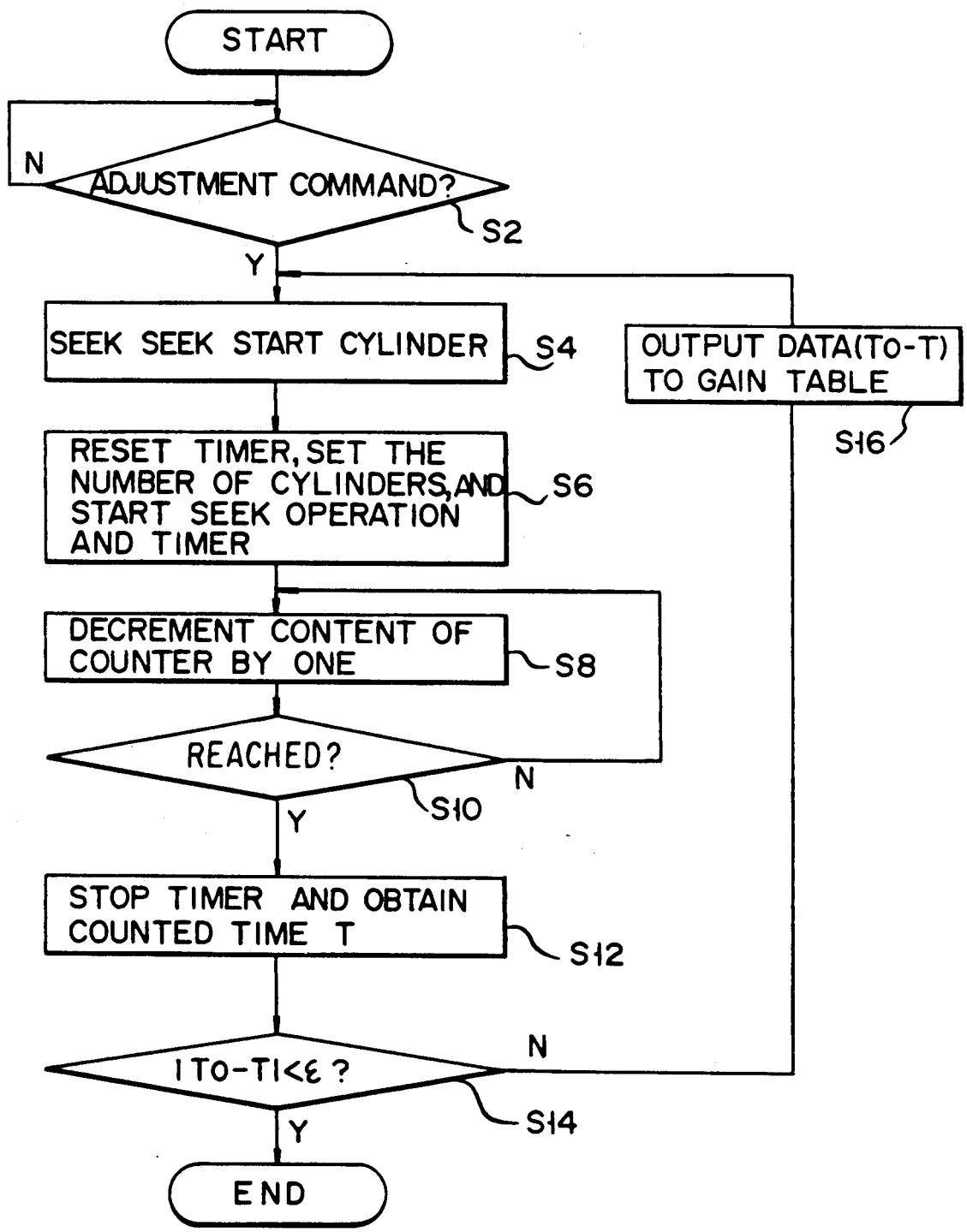
F I G. 5

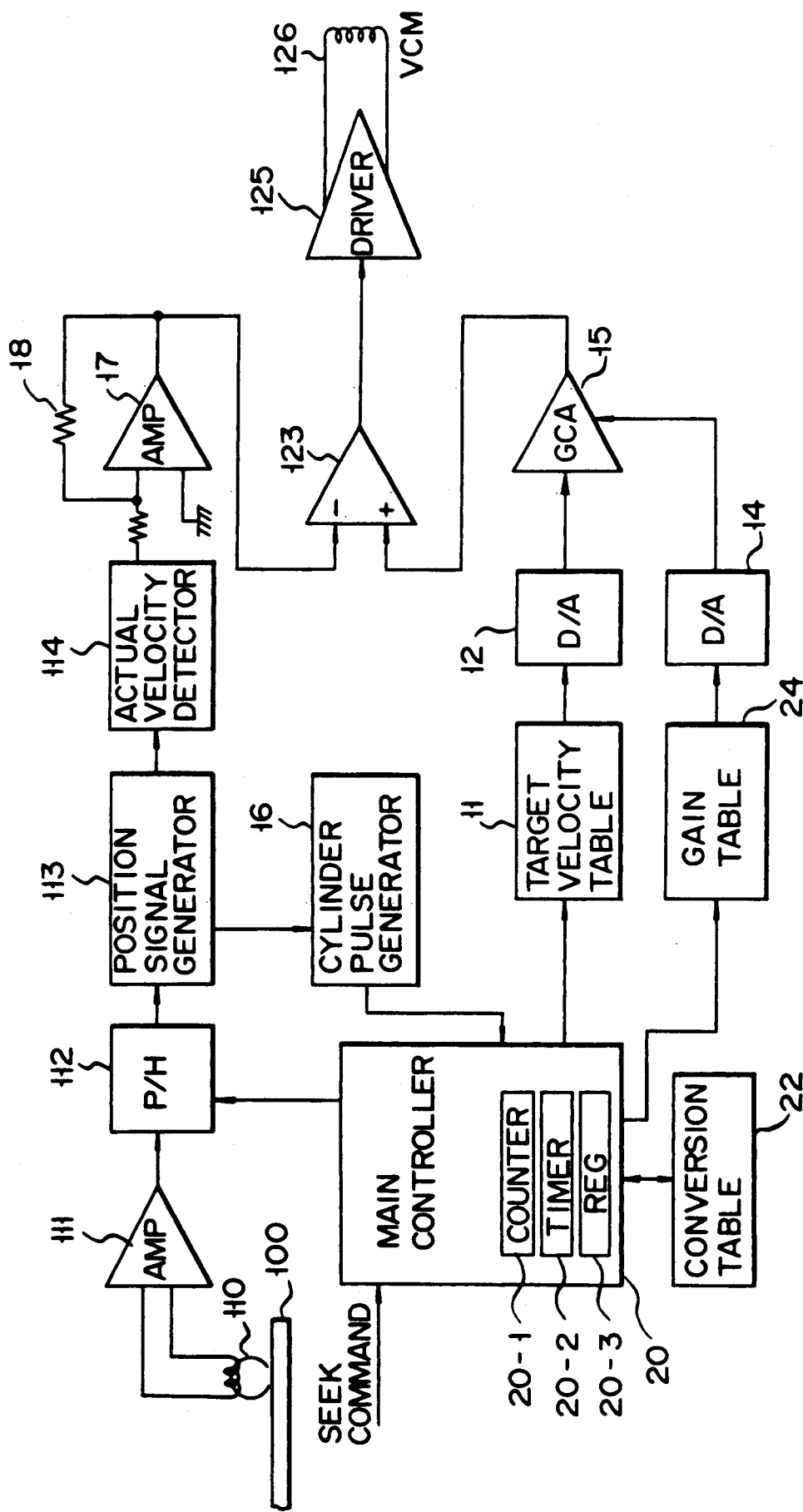
F I G. 6

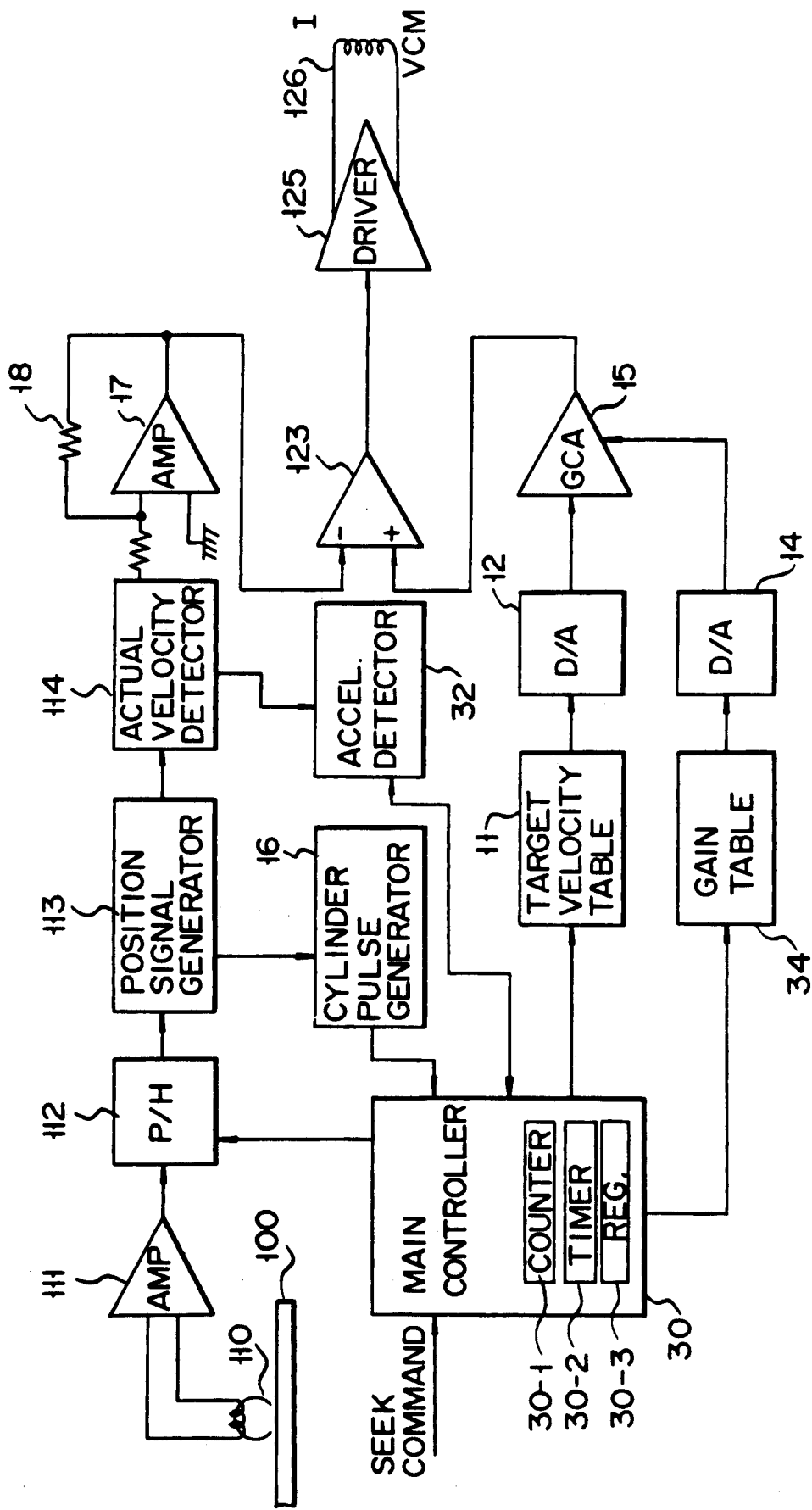
F I G. 8

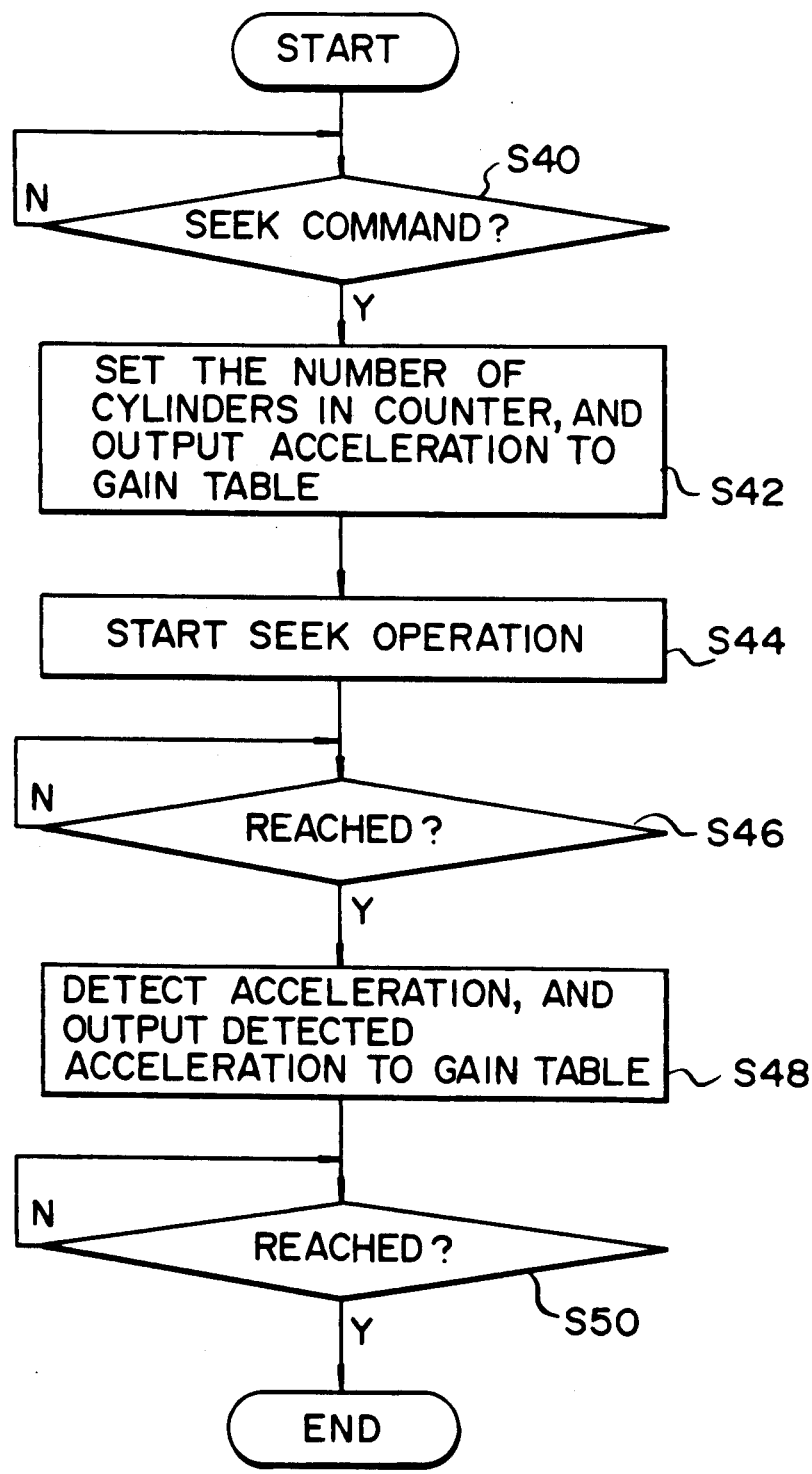
F I G. 9

ACCESS CONTROLLER FOR CONTROLLING THE SEEK OPERATION OF A HEAD RELATIVE TO A RECORDING MEDIUM

BACKGROUND OF THE INVENTION

1. Field of the Invention

The present invention relates to an access controller for controlling the seek operation of a head relative to a recording medium.

2. Description of the Related Art

Various apparatuses are known which access the data recorded on recording media. One of these is a magnetic disk drive apparatus having an access controller with an access mechanism. A magnetic head in the access mechanism is moved in the radial direction of a magnetic disk, i.e., the recording medium, and positioned at a desired cylinder on the magnetic disk. Generally, a voice-coil motor is incorporated in the access controller of the disk drive apparatus for accessing disks having a great data storage capacity. FIG. 1 is block diagram showing the conventional access controller including such an access mechanism.

As is shown in FIG. 1, the access controller comprises a magnetic head 110. The head 110 reads the servo data from a magnetic disk 100 of a dedicated servo system, and generates a servo signal representing the servo data. The servo signal is amplified by an amplifier 111 and input to a peak hold (P/H) circuit 112. In response to the timing control signal supplied from a main controller 127, the peak hold circuit 112 samples the peaks of the servo signal. The values of the peaks, thus sampled, are supplied to a position signal generator 113. The generator 113 generates a position signal from the peak values of the servo signal. An actual velocity detector 114 differentiates the position signal, thus producing the actual velocity signal S1 shown in FIG. 2.

In the meantime, a cylinder pulse generator 117 generates a cylinder pulse from the position signal output from the position signal generator 113. The cylinder pulse represents the fact that the head 110 has moved across a cylinder. The cylinder pulse is supplied to a counter 118, whereby the count value of the counter 118 is reduced by one. The count value has been set to the counter 118 by the controller 127 before the seek operation, and represents the number of cylinders over which the head 100 must move from the current position to the destination cylinder. In accordance with the count value of the counter 118, target velocity table 119 outputs the digital data showing a target velocity. A D/A converter 120 converts the target velocity data into an analog signal, or the target velocity signal S2 shown in FIG. 2.

The actual velocity signal S1 and the target velocity signal S2 are supplied to a subtracter 123 via amplifiers 115 and 121, respectively. The subtracter 123 subtracts the actual velocity signal S1 from the target velocity signal S2, thereby producing the velocity difference signal S3 illustrated in FIG. 2. The signal S3 is supplied to a driver 125. The driver 125 supplies a VCM current I to a voice-coil motor (VCM) 126 in accordance with the velocity difference signal S3. The motor 126 moves the magnetic head 100 to the destination cylinder at the target velocity.

As shown in FIG. 2D, the seek time which the head 110 requires to move from the current position to the destination cylinder is the sum of the three periods during which the head 110 is accelerated, moved at a constant velocity, and decelerated. During the acceleration period, the maximum VCM current I is supplied to the voice-coil motor 126, so that the actual velocity of the head 110 increases to the target velocity. The lengths of the acceleration periods differ among the access controllers, since access mechanisms in the controllers have different characteristics. As a result, the seek times differ among the access controllers. When the seek time is too short, a seek error will occur; when it is too long, a reduction of the throughput of the magnetic disk drive apparatus will occur.

In order to prevent such a seek error, or such a reduction of throughput, variable resistors 116 and 122 are used to weight the actual velocity signal S1 and the target velocity signal S2, respectively, that is, to change the amplitudes of these signals. The time for moving the head 110 from the current position to the destination cylinder is thereby made to fall within a predetermined range, though the voice-coil motor and the access mechanism have characteristics different from those of their counterparts used in other controllers. However, it requires time and cost to adjust the resistors 116 and 122, thereby to appropriately change the amplitudes of the signals S1 and S2. Further, since the access mechanism has its characteristics changed with time, the seek time for moving the head 100 from one cylinder to the destination cylinder falls outside the predetermined range.

SUMMARY OF THE INVENTION

Accordingly, a first object of the present invention is to provide a method of moving a head relative to a recording medium, from one position to another, spending a period of time falling within a predetermined period. A second object of the invention is to provide an access controller for performing this method.

In order to accomplish the first object, the method according to the invention comprises moving a head relative to a recording medium in accordance with an actual velocity signal and a target velocity signal; generating a position signal from position data read out from the recording medium by the head moving relative to the medium; generating the actual velocity signal from the position signal; and generating the target velocity signal from the position signal and also gain data in response to a seek command, the gain data being automatically determined.

In order to achieve the second object, the access controller according to the invention comprises an access mechanism having at least one head which is moved relative to a recording medium in accordance with a velocity difference signal, a driving section responsive to a seek command, for generating a primary velocity signal in accordance with the distance between a current position of the head and a destination cylinder designated by the seek command, for amplifying the primary velocity signal in accordance with input gain data to obtain a target velocity signal, for generating an actual velocity signal from position data read out from the recording medium by the head moving relative to the recording medium, and for generating the velocity difference signal from the target velocity signal and the actual velocity signal to output the velocity difference signal to the access mechanism, and a determination section responsive to an input adjustment command, for determining the gain data and outputting the gain data to the driving section.

Despite its relatively simple structure, the access controller according to the invention can automatically adjust the time for moving the head from the current position to a destination cylinder, making this time fall within a predetermined range. No adjustment of any component of the controller is required to adjust said time.

BRIEF DESCRIPTION OF THE DRAWINGS

FIGS. 2A to 2D show the waveforms of the actual velocity signal, the target velocity signal, the velocity difference signal, and the VCM current in the conventional access controller, respectively;

FIG. 3 is a block diagram an access controller according to a first embodiment of the invention;

FIG. 4 is a diagram explaining the operation principle of the access controller shown in FIG. 3;

FIG. 5 is a flow chart representing the operation of the access controller shown in FIG. 3;

FIG. 6 is a block diagram an access controller according to a second embodiment of the invention;

FIG. 8 is a block diagram an access controller according to a third embodiment of the invention; and FIG. 9 is a flow chart representing the operation of the access controller shown in FIG. 8.

DETAILED DESCRIPTION OF THE PREFERRED EMBODIMENTS

Figure 1:
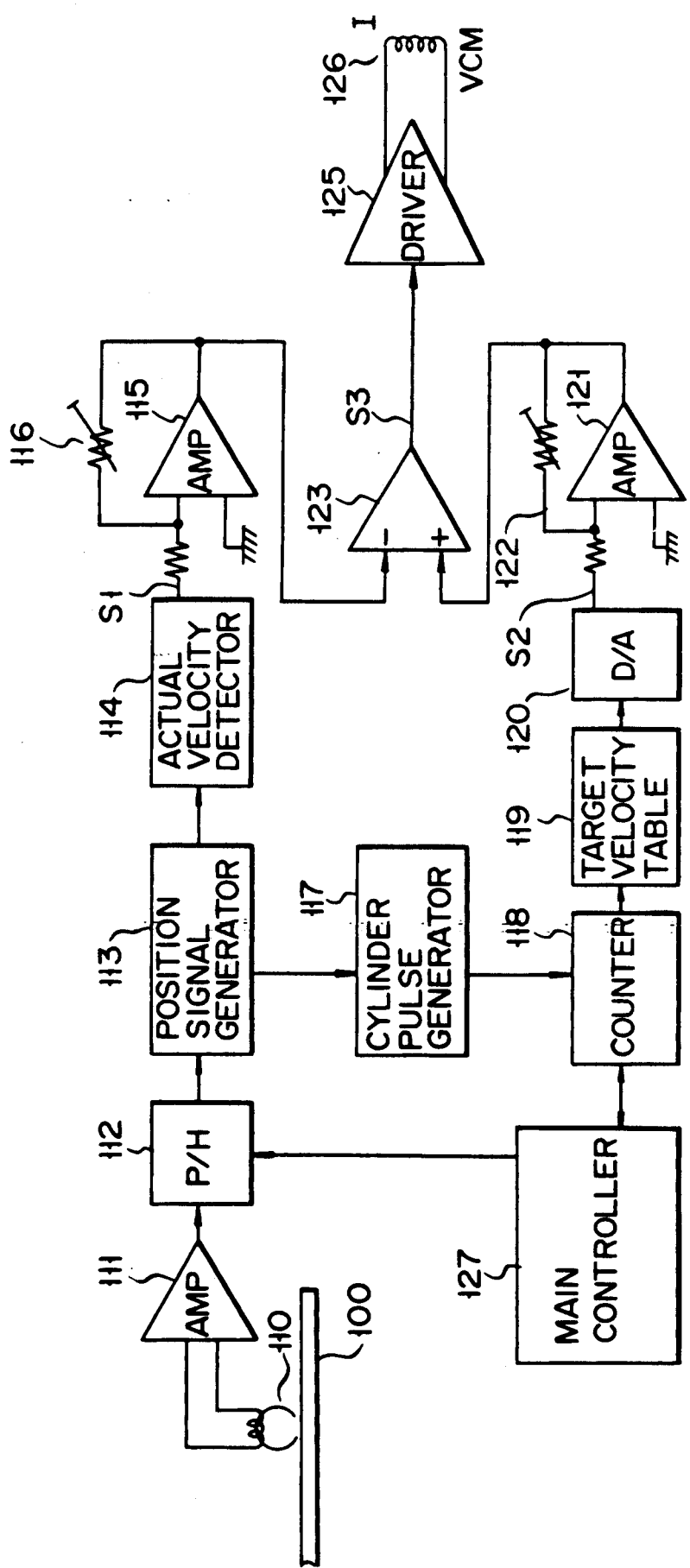
FIG. 1 is a block diagram illustrating a conventional access controller.

An access controller according to the present invention will now be described, taking for example the access controller in a magnetic disk drive apparatus, with reference to the accompanying drawings, in which the same components are designated by the same reference numerals.

First, with reference to FIG. 3, the access controller which is the first embodiment will be described. The magnetic head 110, the amplifier 111, the peak hold (P/H) circuit 112, the position signal generator 113, the actual velocity detector 114, the subtracter 123, the driver 125, and the voice-coil motor 126—all shown in FIG. 3, are identical to their counterparts shown in FIG. 1.

The head 110 reads the servo-data recorded on a magnetic disk 100 of a dedicated servo system, and generates a servo signal representing the servo data. The servo signal is amplified by an amplifier 111 and output to a peak hold (P/H) circuit 112. In response to the timing control signal input from a main controller 10, the peak hold circuit 112 samples the peaks of the servo signal. The values of the peaks, thus sampled, are supplied to a position signal generator 113. The generator 113 generates a position signal from the peak values of the servo signal. The position signal is supplied to an actual velocity detector 114 and a cylinder pulse generator 16. The actual velocity detector 114 differentiates the position signal, thus producing an actual velocity signal. This velocity signal is output to an amplifier 17. A resistor 18 is connected between the output and input of the amplifier 17. The amplifier 17 amplifies the actual velocity signal, with the amplification factor determined by the resistor 18. The amplified actual velocity signal is supplied to the (−) input of a subtracter 123.

Meanwhile, a cylinder pulse generator 16 generates a cylinder pulse from the position signal output from the position signal generator 113. The cylinder pulse shows the fact that the head 100 has moved across a cylinder. The cylinder pulse is supplied to the main controller 10.

The access controller shown in FIG. 3 further comprises a command generator 19. When the power-supply switch (not shown) is turned on, the generator 19 generates an adjustment command to the main controller 10. The main controller 10 has a counter 10-1, a timer 10-2, a subtracter 10-3, and a register 10-4. In response to the adjustment command, the main controller 10 operates to move the magnetic head 110 to a predetermined cylinder where an adjustment operation is to be started. After the head 110 reaches the seek start cylinder, the timer 10-2 is reset. At the same time, the number of the cylinders over which the head 110 must move to reach a destination cylinder is set in the counter 10-1, and time data "0" is set in the register 10-4. Then, to make the head 110 seek the destination cylinder, the count value of the counter 10-1 is output to a target velocity table 11, and the time data "0" is output from the register 10-4 to a gain table 13. At the same time, the timer 10-2 starts counting time.

The target velocity table 11 stores digital target velocity data corresponding to the count value of the counter 10-1, i.e., the numbers of cylinders over which the head 110 must move from the current position to the destination cylinder. The target velocity data corresponding to the count value of the counter 10-1 is output from the table 11 to a D/A converter 12. The D/A converter 12 converts the target velocity data into an analog target velocity signal, which is output to a gain-controlled amplifier (GCA) 15. The GCA 15 amplifies the analog signal in accordance with the gain data supplied from a D/A converter 14, which will be later described. The amplified signal is supplied to the (+) input of the subtracter 123. The subtracter 123 finds the difference between the actual velocity signal and the target velocity signal supplied to the (−) and (+) inputs of the subtracter 123, respectively, and outputs a velocity difference signal to a driver 125. The driver 125 drives a voice-coil motor (VCM) 126 in accordance with the velocity difference signal, whereby the magnetic head 110 is moved toward the destination cylinder.

The gain table 13 stores gain data corresponding to the time data. Since the time data "0" has been set in the register 10-4, the gain data corresponding to the time data "0" is output from the table 13 to D/A converter 14 and convert into analog data. This analog gain data is supplied to the GCA 15.

While the head 110 is moving toward the destination cylinder, passing the cylinders, one after another, the cylinder pulse generator 16 outputs cylinder pulses. Every time the generator 16 outputs a cylinder pulse, the count value of the counter 10-1 decreases by one. The main controller 10 determines, from the count value of the counter 10-1, whether or not the head 110 has reached the destination cylinder. If NO, the count value of the counter 10-1 is supplied to the target velocity table 11. If YES, the timer 10-2 stops measuring time, and the count value of the counter 10-1 is not output to the target velocity table 11. The subtracter 10-3 subtracts the time T the timer 10-2 has measured while the head 110 is actually moving, from a predetermined time period T0. The controller 10 determines whether or not the resulting difference falls within a predetermined range $\epsilon$, and the data representing this difference is stored into the register 10-4.

The operation principle of the access controller according to the present invention will now be explained with reference to FIG. 4.

The seek time which the head requires to move relative to one third cylinders of the whole cylinders in the radial direction of a magnetic disk approximates to the average seek time of a magnetic head. The velocity profile OABC shown in FIG. 4 represents how the speed of the magnetic head 110 normally changes while the head 110 is moving from the current position to a destination cylinder. The line 0A indicates the acceleration period; the line AB the constant velocity period; and the line BC the deceleration period. Obviously, the area of the trapezoid OABC represents the distance between the seek start cylinder and the destination cylinder. Also obvious is that the head 110 reaches the destination cylinder at time C. When the same gain data is used for the access mechanism with the head 110 accelerated as is shown by the line OD, the head 110 reaches the destination cylinder earlier, at time F. In this case, the seek time is likely to be too short, and may fall outside a predetermined range. In order to avoid this, the gain needs the changed, i.e., the constant speed needs be reduced, whereby the head 110 is moved as in shown by the velocity profile OGHC, reaching the destination cylinder substantially at time C.

With reference to the flow chart shown in FIG. 5, it will now be described how the access controller shown in FIG. 3 performs its function.

When the power-supply switch is turned on, the command generator 19 supplies an adjustment command to the main controller 10, in step S2. Then, in step S4, the main controller 10 causes the head 110 to seek a predetermined seek start cylinder, in response to the adjustment command. This seek operation is performed as one step of the power-on reset sequence. When the seek start cylinder is reached, the timer 10-2 is reset in step S6. The number of the cylinders, over which the head 110 must move to reach a predetermined destination cylinder, is set in the counter 10-1. The time data "0" set in the register 10-4 is output to the gain table 13. The table 13 supplies the gain data corresponding to the time data "0" to the D/A converter 14. The D/A converter 14 converts this gain data into analog data. This analog gain data is supplied to the GCA 15. Then, the seek operation is started, and the timer 10-2 is also started.

During the seek operation, the count of the counter 10-1 is output to the target velocity table 11, and the table 11 outputs the target velocity data corresponding to the count value, to the D/A converter 12. The D/A converter 12 converts this data into an analog signal representing the target velocity. The converted target velocity signal is output to the GCA 15. The GCA 15 amplifies the signal in accordance with the gain data supplied from the D/A converter 14. The amplified target velocity signal is supplied to the (+) input of the subtracter 123. No actual velocity signal is input to the (−) input of the subtracter 123 since the magnetic head 110 has yet to move from the seek start cylinder. Therefore, the subtracter 123 produces a maximum velocity difference signal. As a result, the driver 125 drives the VCM 126 with a maximum current, whereby the head 110 is accelerated until its velocity reaches the constant velocity represented by the target velocity data.

While moving relative to the magnetic disk 100, the head 110 reads the servo data. The servo signal corresponding to this data is amplified by the amplifier 111 and supplied to the peak hold circuit 112. The circuit 112 samples the peaks of the signal in response to the timing control signal supplied from the main controller 10. The sampled peak values are supplied to the position signal generator 113. The generator 113 generates, from these peak values, a position signal representing the position of the magnetic head 110. The position signal is output to the actual velocity detector 114, and also to the cylinder pulse generator 16. The detector 114 differentiates the position signal, thereby detecting the velocity of the head 110, and generates an actual velocity signal representing this velocity. The amplifier 17 amplifies the actual velocity signal with the amplification factor determined by the resistor 18. The actual velocity signal, thus amplified, is supplied to the (−) input of the subtracter 123.

Meanwhile, the cylinder pulse generator 16 generates a cylinder pulse from the position signal output from the position signal generator 113. The cylinder pulse shows the fact that the head 100 has moved across a cylinder. In step S8, the cylinder pulse is supplied to the main controller 10. Every time the controller 10 receives a cylinder pulse, the count value of counter 10-1 is decremented by one. In step S10, it is determined, from the count value of the counter 10-1, whether or not the destination cylinder has been reached. If NO, step S8 is executed again.

When the count value of the counter 10-1 decreased to "0," it is determined in step S10 that the head 110 has arrived at the destination cylinder. Then, in step S12, the timer 10-2 is stopped, and the time T the head 110 has required to move from the seek start cylinder to the destination cylinder is obtained. In step S12, the subtracter 10-3 finds the difference between the time T and the time T0 which has been preset in the main controller 10. The difference, thus obtained, is stored into the register 10-4 as time data. The absolute value of this difference, i.e., $|T-T0|$, is compared with a predetermined value $\epsilon$. If the absolute value equal to or less than the value $\epsilon$, the operation is ended. If it is more than the value $\epsilon$, the operation returns to step S4.

When the seek command is input to the main controller 10, the time data stored in the register 10-4 and representing the difference, i.e., $T-T0$, is output to the gain table 13. The gain table 13 supplies the gain data corresponding to the this difference, to the GCA 15 through the D/A converter 14.

As can be understood from the above, the access mechanism need not be adjusted to place the seek time within the predetermined range. Hence, it is easy to manufacture the access controller. In addition, even if the period during which the head 110 is accelerated changes because the access mechanism has its characteristics changed with time, the seek time can be put within the predetermined range.

The access controller according to the second embodiment of the invention will now be described, with reference to FIG. 6. Since this access controller is similar to that one shown in FIG. 3, only the different features will be explained.

As is illustrated in FIG. 6, a main controller 20 has a counter 20-1, a timer 20-2, and a register 20-3, which are identical to the components 10-1, 10-2, and 10-4 of the main controller 10 in the access controller shown in FIG. 3. A conversion table 22 is connected to main controller 20. This table 22 stores the conversion time data corresponding to a period of time which a magnetic head 110 requires to move from a predetermined seek start cylinder to a predetermined destination cylinder. The main controller 20 reads new conversion time data from the conversion table 22, in accordance with the number of cylinders, over which the head 110 must move to reach the destination cylinder designated by the seek command, and which is held in the main controller 20, the time measured by the timer 20-2, and the conversion time data stored in the register 20-3. The new conversion time data is stored into the register 20-3. This conversion time data is supplied to a gain table 24 when the main controller 20 receives the next seek command. The table 24 stores the gain data corresponding to the conversion time data stored in the conversion table 22. The table 24 outputs the gain data to a GCA 15 through a D/A converter 14, and a gain of the GCA is controlled in accordance with the gain data.

Figure 7:
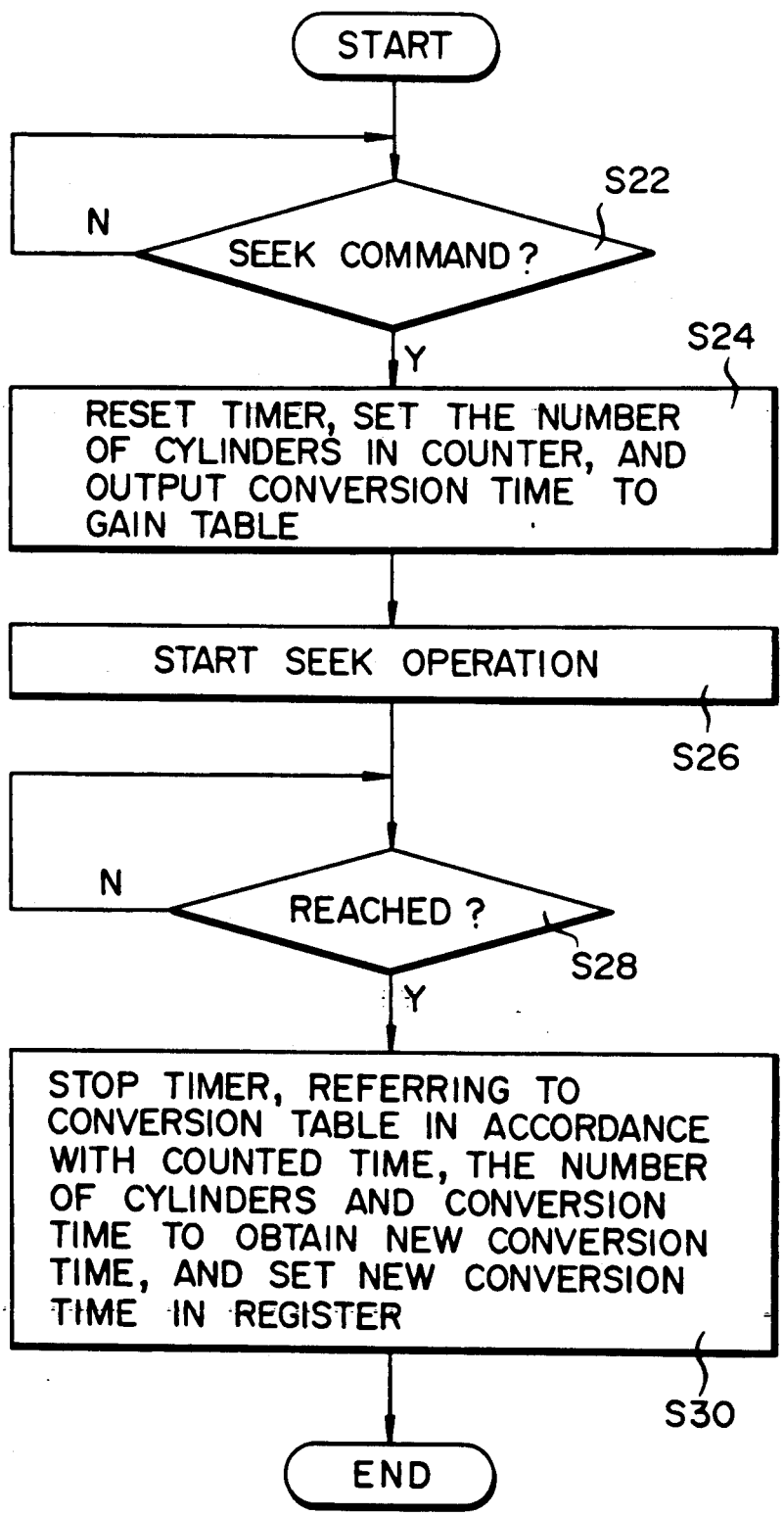
FIG. 7 is a flow chart representing the operation of the access controller shown in FIG. 6.

With reference to the flow chart shown in FIG. 7, it will be explained how the access controller shown in FIG. 6 operates. The conversion time data has been stored into the register 20-3. In step S22, it is determined whether or not the seek command has been input to the main controller 20. If YES, the operation goes to step S24. In step S24, the data representing the number of cylinders over which the head 110 must move to reach the destination cylinder designated by the seek command is stored into the counter 20-1. Also, in step S24, the timer 20-2 is reset, and the conversion time data stored in the register 20-3 is output to the gain table 24. The gain data read from the gain table 24 is converted by the D/A converter 14 into analog data, which is supplied to the GCA 15. Then, in step S26, the seek operation is started. That is, the head 110 seeks the destination cylinder in the same way as in the access controller shown in FIG. 3. And, a timer 20-2 is started.

In step S28, it is determined whether or not the head 110 has reached the destination cylinder. If YES, step S30 is executed. In step S30, the timer 20-2 is stopped. Thereafter, the main controller 20 reads new conversion time data from the conversion table 22, in accordance with the period of time measured by the timer 20-2, the number of cylinders held in the controller 20, and the conversion time data stored in the register 20-3, and the new conversion time data stores into register 20-3 for use in the next seek operation.

As has been described, in the second embodiment (FIG. 6), the time during which the head 110 is moved is adjusted for every seek operation. Therefore, the time is adjusted more accurately than in the first embodiment (FIG. 3).

The access controller according to the third embodiment of the invention will now be described with reference to FIG. 8. Since this access controller is similar to that one illustrated in FIG. 3, only the different features will be explained.

As is shown in FIG. 8, the access controller comprises a main controller 30 which has a counter 30-1, a timer 30-2, and a register 30-3. The counter 30-1 is identical to the counter 10-1 used in the first embodiment. The data representing the number of cylinders over which a magnetic 110 must move to reach a destination cylinder is stored in the register 30-3. When a seek command is supplied to the main controller 30, the timer 30-2 is started. When it is detected from the count value of the timer 30-2 that a predetermined period of time has elapsed while the head 110 is moving toward the destination cylinder, the main controller 30 generates a control signal.

As is obvious from FIG. 8, the access controller further comprises an acceleration detector 32 and a gain table 34. In response to the control signal output from the main controller 30, the acceleration detector 32 detects the acceleration of the head 110 from the actual velocity of the head 110 which an actual velocity detector 114 has detected. The detector 32 supplies the data showing the acceleration, to the main controller 30. The main controller 30 holds the acceleration data and output the data items stored and the data representing the number of cylinders stored in the register 30-3 to the table 34, from which gain data is output to the GCA 15 via the D/A converter.

As can be understood from FIG. 4, the constant velocity must be reduced when the head 110 is accelerated as is indicated by line OD. How much the constant velocity should be decreased can be determined by the area of triangle ODA and the number of cyliders over which the head 110 must move to reach the destination cylinder. Since the maximum current I is supplied to the VCM 126 during the acceleration period, the head 110 is accelerated substantially at the same rate. Hence, the constant velocity can be estimated from the acceleration detected upon lapse of a predetermined time from the start of the seek operation, and also from the number of cylinders over which the head 110 must move to reach the destination cylinder.

With reference to the flow chart shown in FIG. 9, it will be explained how the access controller shown in FIG. 8 operates. In step S40, it is determined whether or not the seek command has been input to the main controller 20. If YES, the operation goes to step S42. In step S42, the data representing the number of cylinders over which the head 110 must move to reach the destination cylinder designated by the seek command is set in the counter 30-1 and the register 30-3. Also, in step S42, the timer 30-2 is reset. The data showing the acceleration held in the controller 30 and the data representing the number of cyliders stored in the register 30-3 are supplied to the gain table 34. The gain data output from the table 34 is converted by D/A converter 14 into analog data, which is supplied to the GCA 15. Then, in step S44, a timer 30-2 is started and the seek operation is started. That is, the head 110 seeks the destination cylinder in the same way as in the access controller shown in FIG. 3.

In step S46, it is determined from the data set in the timer 30-2 whether or not a predetermined time has passed from the start of the seek operation. If YES, the main controller 30 outputs a control signal to the detector 32. In step S48, in response to the control signal, the detector 32 detects the acceleration of the head 110 from the actual velocity detected by the detector 114, and outputs the data showing the acceleration to the main controller 30. The main controller 30 holds the acceleration data and output to the table 34 the acceleration data, together with the data stored in the register 30-3 and showing the number of cylinders. The gain data output from the table 34 is supplied to the D/A converter 14. The D/A converter 14 converts the gain data into analog data, which is supplied to the GCA 15. In accordance with this gain data, the GCA 15 amplifies the target velocity signal, thereby changing the target velocity. In step S50, it is determined whether or not the head 110 has reached the destination cylinder. If YES, then the seek operation is ended.

As has been described, in the third embodiment (FIG. 8), the gain data is changed or renewed for every seek operation. Therefore, the seek time which the head 110 requires to reach the destination cylinder is adjusted more accurately than in the first embodiment (FIG. 3).

In the third embodiment, the acceleration of the head 110 is detected upon lapse of a predetermined period from the start of the seek operation. Alternatively, the acceleration can be detected after the head 110 has moved over a predetermined number of cylinders.

What is claimed is:

1. An access controller for a recording medium, comprising:
    an access mechanism having at least one head, for moving said head relative to said recording medium in accordance with an input velocity difference signal;
    driving means responsive to an input seek command, for generating a primary velocity signal in accordance with a distance from a current position of said head to a destination cylinder designated by the seek command, amplifying the primary velocity signal in accordance with input gain data to obtain a target velocity signal, generating an actual velocity signal from position data readout from said recording medium by said head while said head is moved, and generating the velocity difference signal from the target velocity signal and the actual velocity signal to output the velocity difference signal to said access mechanism; and
    determination means responsive to an input adjustment command, for determining the gain data and outputting the gain data to said driving means.

2. A controller according to claim 1, further comprising means for generating the adjustment command when a power is turned on.

3. A controller according to claim 1, wherein said determination means comprises:
    first generation means responsive to the adjustment command, for generating a first command as the seek command to cause said head to seek a first cylinder;
    second generation means for generating a second command as the seek command to cause said head to seek a second cylinder, after the first cylinder is reached; and
    first gain determining means responsive to the second command, for determining the time when said head is moved from said first cylinder to the second cylinder, and determining the gain data in accordance with the determined time.

4. A controller according to claim 3, wherein the first and second cylinders are predetermined, and said first gain determining means comprises:
    counting means for counting the time when said head is moved from said first cylinder to the second cylinder;
    a first gain table for storing the gain data corresponding to the time; and
    referring means for referring to said first gain table in accordance with the counted time to obtain the gain data.

5. An access controller for a recording medium, comprising:
    an access mechanism having at least one head, for moving said head in accordance with an input velocity difference signal;
    driving means responsive to an input first seek command, for generating a primary velocity signal in accordance with a distance from a current cylinder of said head to a destination cylinder designated by the seek command, amplifying the primary velocity signal in accordance with input gain data to obtain a target velocity signal, generating an actual velocity signal from position data readout from said recording medium by said head while said head is moved, and generating the velocity difference signal from the target velocity signal and the actual velocity signal to output the velocity difference signal to said access mechanism; and
    determination means responsive to a second seek command, for determining the gain data and outputting the gain data to said driving means.

6. A controller according to claim 5, wherein said determination means comprises:
    counting means for counting a time when said head is moved from a first cylinder to a second cylinder, the first and second cylinders being associated with the second seek command previous to the first seek command;
    a second gain table for storing the gain data corresponding to a reference time;
    conversion means for converting the counted time into the reference time in accordance with a held reference time and the number of cylinders and holding the reference time;
    referring means for referring to said second gain table in accordance with the reference time to obtain the gain data.

7. A controller according to claim 5, wherein the first and second seek commands are identical, and said determination means comprises:
    detecting means for detecting an acceleration from the actual velocity signal in response to an input detect command;
    generating means for generating and outputting to said detecting means the detect command after a predetermined time is elapsed from start of a seek operation associated with the first seek command;
    a third gain table for storing the gain data;
    referring means for referring to said third gain table in accordance with the acceleration and the number of the cylinders from the current cylinder to the destination cylinder associated with the first seek command to obtain the gain data.

8. A controller according to claim 5, wherein the first and second seek commands are identical, and said determination means comprises:
    detecting means for detecting an acceleration from the actual velocity signal in response to an input detect command;
    generating means for generating and outputting to said detecting means the detect command when said head is moved for predetermined cylinders from the current cylinder in accordance with the first seek command;
    a third gain table for storing the gain data;
    referring means for referring to said third gain table in accordance with the acceleration and the number of the cylinders from the current cylinder to the destination cylinder associated with the first seek command to obtain the gain data.

9. A controller according to claim 5, wherein said access mechanism includes a voice coil motor and means for supplying a constant current to said voice coil motor while said head is accelerated.

10. A method of controlling a time accessing to a recording medium, comprising:

moving a head in accordance with an actual velocity signal and a target velocity signal;

generating a position signal from position data readout from the recording medium by the head while the head is moved relative to the recording medium;

generating the actual velocity signal from the position signal; and generating the target velocity signal from the composition signal and gain data in response to a seek command, the gain data being automatically determined;

wherein said generating of the target velocity signal comprises:

generating a primary velocity signal from the position signal; and amplifying the primary velocity signal in accordance with the gain data.

11. A method according to claim 10, further comprising predetermining the gain data.

12. A method according to claim 11, wherein said predetermining of the gain data comprises:

generating a first command in response to an adjustment command to move the head to a predetermined first cylinder;

generating a second command when the first cylinder is reached, to move the head to a predetermined second cylinder;

counting the time when the head is moved from the first cylinder to the second cylinder, in response to the second command; and determining the gain data from the counted time.

13. A method according to claim 12, further comprising generating the adjustment command when a power is turned on.

14. A method according to claim 11, wherein said predetermining step comprises:

counting the time when the head is moved from a first cylinder to a second cylinder in response to a second seek command previous the seek command;

converting the counted time into a reference time in accordance with the number of cylinders between the first and second cylinders; and determining the gain data from the reference time.

15. A method of according to claim 11, wherein said predetermining step comprises:

detecting acceleration of the head from the actual velocity signal; and determining the gain data from the acceleration of the head and the number of cylinders to a destination cylinder associated with the seek command.

* * * * *